US010313929B2

(12) United States Patent
Bhamidipati et al.

(10) Patent No.: US 10,313,929 B2
(45) Date of Patent: Jun. 4, 2019

(54) PACKET PROCESSOR STEERING IN WI-FI ACCESS POINTS WITH MULTIPLE WI-FI PROTOCOL INTERFACES

(71) Applicant: Fortinet, Inc., Sunnyvale, CA (US)

(72) Inventors: Subrahmanyam Bhamidipati, Hyderabad (IN); Siva Rama Krishna Rao Yogendra Jupudi, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/475,107

(22) Filed: Mar. 30, 2017

(65) Prior Publication Data

US 2018/0288652 A1  Oct. 4, 2018

(51) Int. Cl.
| | |
|---|---|
| *H04W 84/18* | (2009.01) |
| *H04W 28/08* | (2009.01) |
| *H04W 88/08* | (2009.01) |
| *H04W 88/00* | (2009.01) |
| H04W 84/12 | (2009.01) |

(52) U.S. Cl.
CPC .......... *H04W 28/08* (2013.01); *H04W 88/00* (2013.01); *H04W 88/08* (2013.01); *H04W 84/12* (2013.01)

(58) Field of Classification Search
CPC ..... H04W 88/10; H04W 84/00; H04W 84/02; H04W 84/12; H04W 84/18; H04W 92/02; H04W 16/14; H04W 28/00; H04W 28/08
See application file for complete search history.

(56) References Cited

U.S. PATENT DOCUMENTS

| | | | | |
|---|---|---|---|---|
| 9,319,156 | B2* | 4/2016 | Ponnuswamy | ........ H04B 17/30 |
| 9,888,096 | B1* | 2/2018 | Mattela | .................... H04L 69/18 |
| 9,948,326 | B2* | 4/2018 | Emmanuel | ........... H04B 1/0053 |
| 2016/0128110 | A1* | 5/2016 | Sirotkin | .............. H04W 76/022 |
| | | | | 370/329 |
| 2017/0013604 | A1* | 1/2017 | Vermani | ............... H04W 16/14 |

* cited by examiner

*Primary Examiner* — Mohamed A Kamara
(74) *Attorney, Agent, or Firm* — Law Office of Dorian Cartwright; Dorian Cartwright

(57) ABSTRACT

Network packet are steered to a particular processor of multiple available processors on an access point. Multiple WLAN interfaces can include at least one WLAN interface dedicated to network packets in compliance with IEEE 802.11ac and at least one WLAN interface dedicated to network packets in compliance with IEEE 802.11bgn. Responsive to a determination of a single station destination, a packet distribution index is determined for the network packet with respect to each of the multiple processing cores. The packet distribution index is based on at least whether a network packet is formatted according to IEEE 802.11ac or to IEEE 802.11bgn, among other factors. The network packet is processed by the processing core having the lowest packet distribution index.

10 Claims, 6 Drawing Sheets

PACKET PROCESSOR STEERING IN WI-FI ACCESS POINTS WITH MULTIPLE WI-FI PROTOCOL INTERFACES

FIELD OF THE INVENTION

The invention relates generally to computer networking, and more specifically, to packet processor steering in Wi-Fi access points with multiple processing cores based on Wi-Fi packet attributes.

BACKGROUND

In wireless networking hardware configurations, access points provide an on ramp for wireless stations to reach the Internet and other networks. A single access points can be equipped with multiple processors in order to service traffic loads generated by many wireless stations in addition to hard wired stations. Furthermore, the access point handles different types of traffic based on different types of wireless networking protocols used by wireless stations. For example, IEEE 802.11bgn (i.e., IEEE 802.11b, IEEE 802 are three types of legacy networking standards. More recently, IEEE 802.11 ac is a faster, high throughput networking standard used by some wireless stations.

However, traffic volume at a particular wireless interface has peaks and valleys depending on which stations are connected at a particular time. An individual processor may process traffic for one interface distinctly from traffic for another interface. More specifically, context switching results from changing over to process an IEEE 802.11ac network packet subsequent to processing an IEEE 802.11bgn network packet, fetches are sent out to load up the corresponding instructions. Additionally, IEEE 802.11ac network packets can have significantly larger data fields from aggregation that require more processing time, thereby increasing sensitivity to processor interrupts.

What is needed is a robust packet processor steering technique in which multiple processing cores are balanced based on actual Wi-Fi traffic over a WLAN (wireless local access network).

SUMMARY

These shortcomings are addressed by the present disclosure of methods, computer program products, and systems for packet processor steering in Wi-Fi access points with multiple processing cores based on Wi-Fi packet attributes.

In one embodiment, a network packet for processing between a source and destination is received. The source or destination is one of multiple core network interfaces and the other of the source or destination is one of multiple WLAN interfaces. The multiple WLAN interfaces can include at least one WLAN interface dedicated to network packets in compliance with IEEE 802.11ac and at least one WLAN interface dedicated to network packets in compliance with IEEE 802.11bgn.

In another embodiment, it is determined whether the network packet has a destination involving a single station or multiple stations. The efficiency of single station destinations (or single destination interface) tends to make up for the additional overhead while the organic efficiency of multiple station destinations (or multiple destination interfaces) is hindered by the additional overhead, in some embodiments. Other embodiments apply the techniques described herein to multiple destinations as well. Responsive to a determination of a single station destination, a packet distribution index is determined for the network packet with respect to each of the multiple processing cores. The packet distribution index is based on at least whether a network packet is formatted according to IEEE 802.11ac or to IEEE 802.11bgn.

A processor of the multiple processor having a lowest packet distribution index for processing the network packet is selected and the network packet is processed. Finally, the processed network packet is transmitted over an appropriate one of multiple WLAN interfaces of the one of multiple core network interfaces, opposite of the received network packet.

Advantageously, access point throughput performance is improved with optimized balancing over multiple processing cores.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for packet processor steering in WLAN access points with multiple processing cores based on WLAN packet attributes. One of ordinary skill in the art will recognize many additional variations made possible by the succinct description of techniques below.

Figure 1:
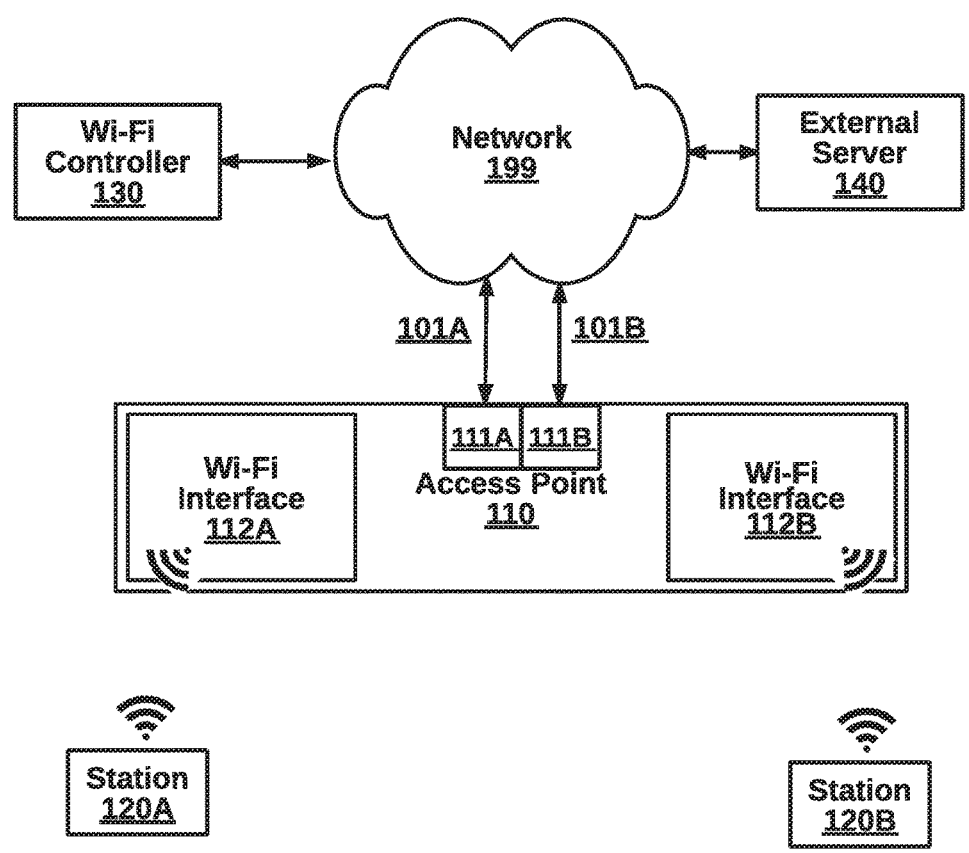
FIG. 1 is a high-level block diagram illustrating a system for steering packet processor steering in Wi-Fi access points with multiple processing cores based on a packet distribution index, according to one embodiment.
Figure 2:
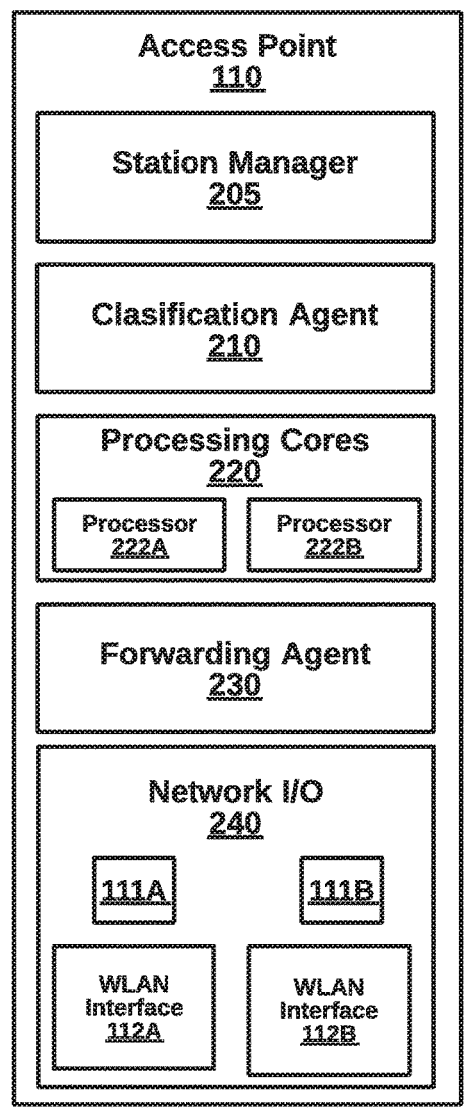
FIG. 2 is a more detailed block diagram illustrating an access point of the system of FIG. 1, respectively, according to one embodiment.
Figure 3:
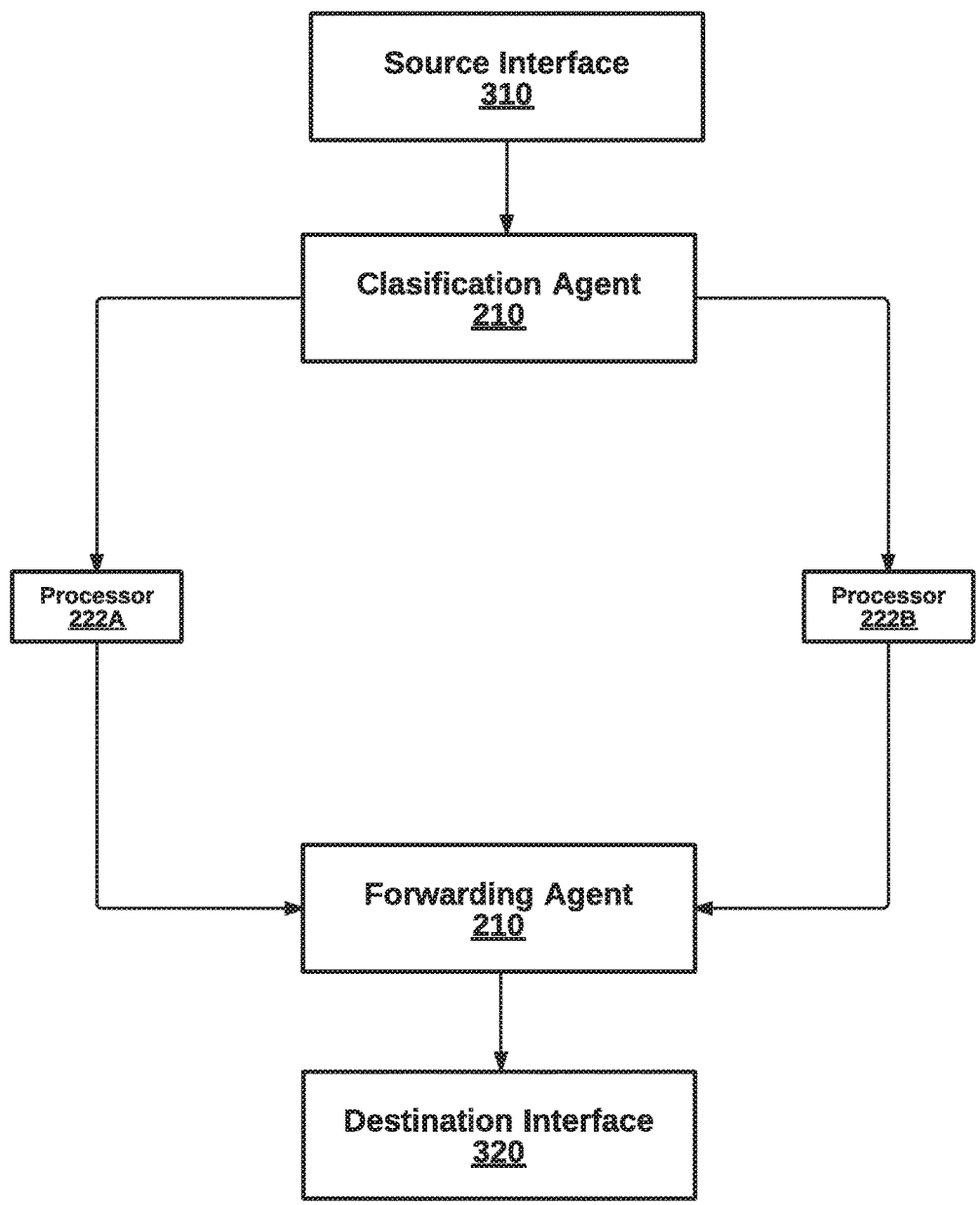
FIG. 3 is a block diagram illustrating an example processing data path of FIG. 1, according to some embodiments.

Systems for Packet Processor Steering (FIG. 1-3)

FIG. 1 is a high-level block diagram illustrating a system 100 for steering packet processing in Wi-Fi access points with multiple processing cores based on a processing distribution index, according to one embodiment. The system 100 includes an access point 110, stations 120A,B, Wi-Fi controller 130 and external server 140. Many other embodiments are possible, for example, with more access points, more or fewer stations, additional components, such as firewalls, routers, switches, and the like.

The access point 110 is wirelessly coupled to the stations 120A,B through Wi-Fi interfaces 112A,B. In turn, the access point 110 is preferably hard wired to the network 199 through ports 111A,B over lines 101A,B. The Wi-Fi controller 130 and the external server 140 are also coupled to the network 199 through a wired or wireless media. The network 199 can be a data communication network such as the Internet, a WAN, a LAN, can be a cellular network, or a hybrid of different types of networks.

In one embodiment, the access point 110 processes and forwards network packets exchanged with stations 120A,B. In one case, network packets are sent upstream to an external server 140 or other external resource. In another case, network packets are sent downstream (e.g., in response to upstream packets) from the external server 140 or other external resource. Internally, network packets are received at a source input, steered to one or multiple processing cores within the access point 110, and then are transmitted at a destination output. A specific processing core of the multiple processing core having the lowest packet distribution index for a network packet is selected for processing a particular packet. In one embodiment, processing of several network packets is steered as a unit under a single score.

Generally, the packet distribution index characterizes a potential burden for processing a network packet. Throughput of the access point 110 is maximized by iteratively routing through a processing path having the least burden. The packet distribution index is a multifactor calculation for each processing core taking in to consideration the circumstances of serving an IEEE 802.11ac network and an IEEE 802.11 bgn network at the same time. The variability of packet volume for the different networks, and the variability of processing burdens for different packets make default processor assignments problematic. However, default assignments can be a factor of the packet distribution index. Other embodiments consider whether kernel space processing is needed, a source input, a destination output, a number of interrupts, and a number of context switches. The factors can be equally or unequally weighted. A highest score or a lowest score can indicate the most optimal burden.

In operation, the access point 110 periodically sends beacons with embedded SSIDs (service set identifiers) to advertise network presence to stations within radio range. Stations connect to the SSID and begin exchanging data with the network 199. The stations 112A,B are sometimes mobile and, as a result, are handed off to and from neighboring access points. More detailed embodiments of the access point 110 are set forth below with respect to FIG. 2.

In one embodiment, the Wi-Fi controller 120 manages multiple access points and stations on the network 199. For example, network packets of a new session are forwarded to the controller 120 from the access point 110. The controller 120 may recognize a certain application, or certain flow that has specialized rules or policy applications. Other tasks of the Wi-Fi controller 120 can include managing SSID assignments and hand-offs, implementing system-wide Wi-Fi policies, load balancing, managing a number of station connections at a particular access point, and the like.

The stations 120A,B, in some embodiments, are oblivious to processor steering operations on the access point 110. However, the stations 120A,B do benefit from higher throughput and performance of the access point 110. The stations 120A,B can be wireless devices carried by employees of a company or by family members in a household.

Figure 6:
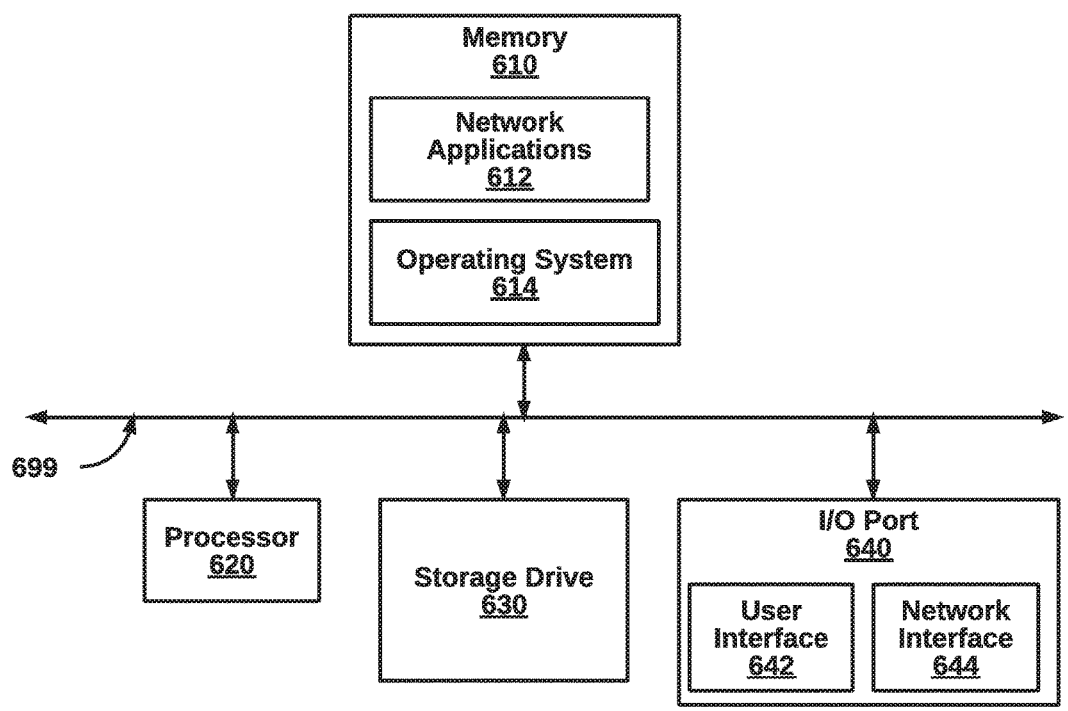
FIG. 6 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating an access point 110 of the system of FIG. 1, respectively, according to one embodiment. The access point 110 includes a station manager 205, a classification agent 210, processing cores 220, forwarding agent 230, and network I/O 240.

The station manager 205 tracks stations registered with an SSID of the access point 110. A table can store MAC addresses of each station so that network packets can be routed to and from connected stations. Network packets from MACS that are not part of the table can be ignored. In some embodiments, the Wi-Fi controller 130 sends commands for station management that are implemented by the access point 110.

The classification agent 210, in one embodiment, selects a processing core from available processing cores for processing a particular network packet or group of network packets. To implement a selection, the classification agent 210 can send memory location pointers corresponding to a specific network packet in a queue to a particular processor. In another example, network packet data is copied to a local cache accessed by a particular processor.

A packet distribution index is calculated with respect to each processing core, as described herein. One embodiment calculates the packet distribution index as $PDI(n)=CUF(n)+PI(n)+FC(n)+nINT(n)+nCTX(n)$. Other embodiments can consider more or fewer factors with different scoring rules. Another embodiment changes the scoring factors on a per packet, a per session, or a per interface basis, thereby implementing several formulas for an embodiment. The following scoring algorithm is intended as a non-limiting example.

The CUF factor at processor n represents a CPU usage factor evaluated according to one example as:

| CUF | Usage | Comment |
| --- | --- | --- |
| 10 | 0-60 | Normal usage |
| 20 | 60-80 | Medium usage |
| 30 | 80-90 | High usage |
| 40 | 90-100 | Extreme usage |

Accordingly, CPU usage less than 60% accumulates $CUF(n)=10$ points while CPU usage near 100% accumulates $CUR(n)=40$ points. The closer to maximum usage, the more throughput is affected in a negative manner. Other embodiments are possible.

The PI can represent a path index to factor in pre-assigned processing cores. For example, deep packet inspection operations can be assigned to on processor, while IEEE 802.11ac operations are assigned to a different processor. One example scores a pre-assigned processor with $PI(n)=10$ points while scoring the other processors not assigned to a particular operation with $PI(n)=20$ points. This causes more weighting to pre-assigned processing cores that are overridden by other conditions.

The FC considers cache and TLB performance improvements by weighting the network packets from the same source higher. For example, if a previous network packet (or within a sliding window) is processed on core n, then $FC(n)=10$ and for the other processing cores $FC(n)=20$.

The nINT(n) can account for a number of interrupts. Hard and soft IRQs typically have higher priority than standard network packet processing and thus, can slowdown a particular data path as the number of interrupts increase. The nINT(n) can be scored 10 for each interrupt.

The nCTX(n) considers the effect of context switches in processing. A user space application can cause a context switch between the kernel space and the user space increasing latency in network packet processing.

As an example, the packet distribution score can be tipped by a network packet requiring kernel processing rather than just being bridged without the additional requirement. In the bridging situation, either processing core is selected because the score is the same (PDI(0)=30+20+20+20+10=100 while PDI(1)=40+20+10+10+20=100):

|      | Core 0 | Core 1 |
|------|--------|--------|
| CUF  | 30     | 40     |
| PI   | 20     | 20     |
| FC   | 20     | 10     |
| nINT | 20     | 10     |
| nCTX | 10     | 20     |

However, the kernel processing reduces the score of core 1 which is preassigned to kernel processing (PDI(0)=30+20+20+20+10=100 while PDI(1)=40+10+10+10+20=90):

|      | Core 0 | Core 1 |
|------|--------|--------|
| CUF  | 30     | 40     |
| PI   | 20     | 10     |
| FC   | 20     | 10     |
| nINT | 20     | 10     |
| nCTX | 10     | 20     |

Therefore, core 1 is selected for processing.

The processing cores 220 further comprise processor 222A and processor 222B for executing instructions against network packets. Other embodiments can include 4, 8 or more processing cores. The processing cores 222A,B can be embedded in a single semiconductor substrate or separate substrates. The processors 222A,B can be general purpose microprocessors, mobile processors, ASICs, FPGAs, specialized networking processors, or the like. In one example, the techniques described herein increase the performance of general processors to approach the performance of specialized network processors having hardware optimizations.

In operation, the processors 222A,B execute user applications against network packets. Example user applications include SDN applications, network policies, security processes, quality of service. The processors 222A,B also execute kernel functions against network packets, such as deep packet inspection and controller forwarding. In one embodiment, a feedback from the processing cores 220 to the classification agent 210 provides real-time statistics for CPU utilization, how a cache is populated, status of processing a particular network packet, and the like. As a result, the feedback data can be taken into account when steering upcoming network packets.

The forwarding agent 230 is notified when a network packet has completed processing. Completed network packets headed upstream are then transmitted through core network interfaces 111A or 111B. Downstream completed network packets are transmitted through WLAN interface 112A or 112B. The core network interfaces 111A,B can both be redundant Ethernet I/O ports allowing a cable to be connected. The network interfaces 111A,B can also be separately connected to the Internet for external access and connected to a LAN for internal access. The Wi-Fi interfaces 112A,B connect to different transceivers which can use different wireless protocols to serve stations according to protocol (e.g., IEEE 802.11ac, IEEE 802.11b and/or g and/or n, Bluetooth, 3G, and 4G). The Wi-Fi interfaces 112A,B can also operate under the same protocol at different bandwidths (e.g., 5 GHz or 2.4 GHz).

More specifically, FIG. 3 illustrates potential data paths for network packets. A first data path from a source interface 310 traverses from the classification agent 210 to processor 222A, and to forwarding agent 210 before being transmitted by a destination interface 320. A second data path from the source interface 310 traverses from the classification agent 210 to processor 222B, and can also be handled by the forwarding agent 210 for transmission over the same destination interface 320. In other data paths, the source interface 210 or the destination interface 320 varies. In yet other data paths, different processors are traversed. The source interface 310 and the destination interface 320 generically refers to any of the upstream or downstream interfaces.

II. Methods for Packet Processor Steering (FIG. 4-5)

Figure 4:
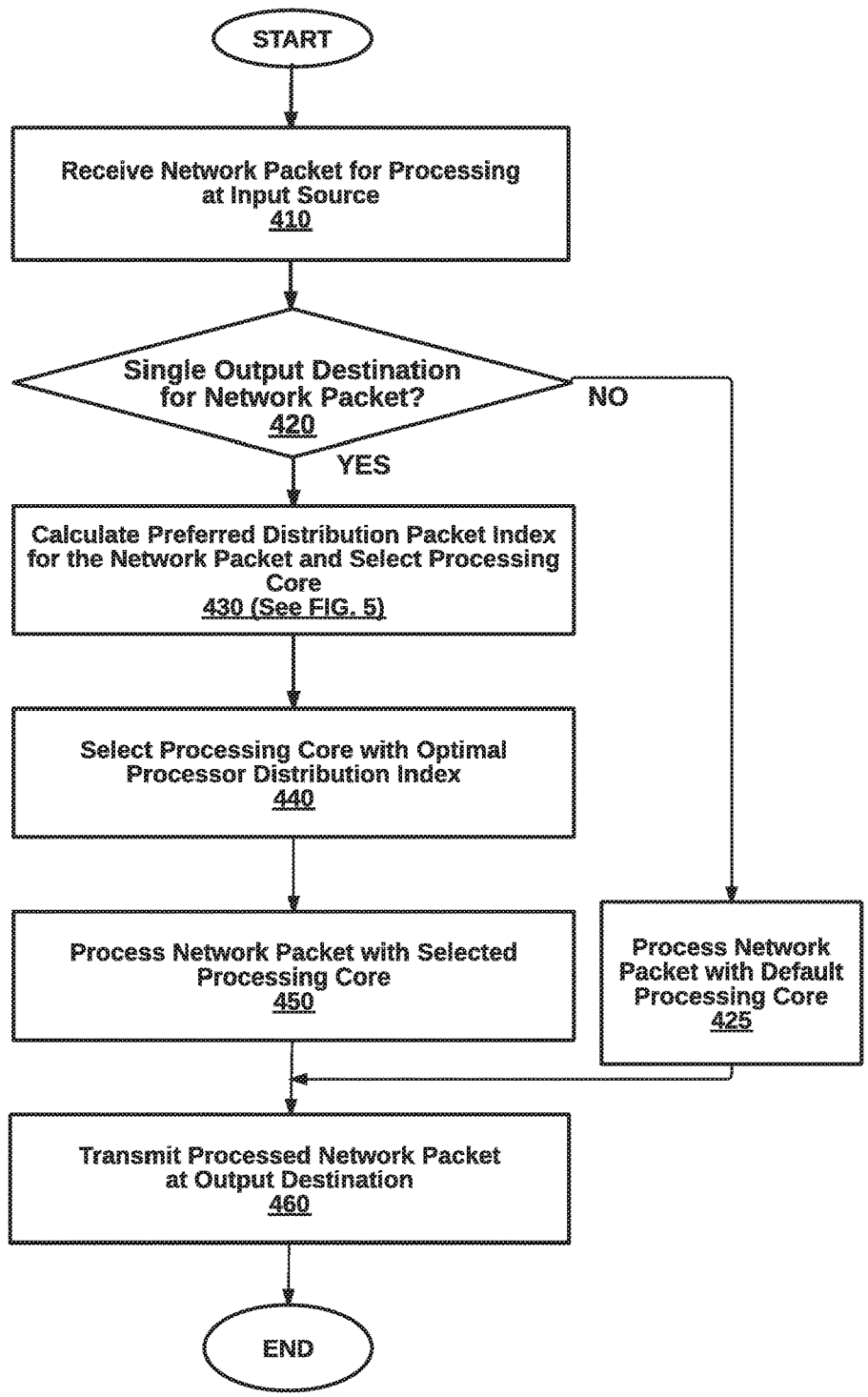
FIG. 4 is a high-level flow diagram illustrating a method for packet processor steering in WLAN access points with multiple processing cores based on WLAN packet attributes based on a packet distribution index, according to one embodiment.
Figure 5:
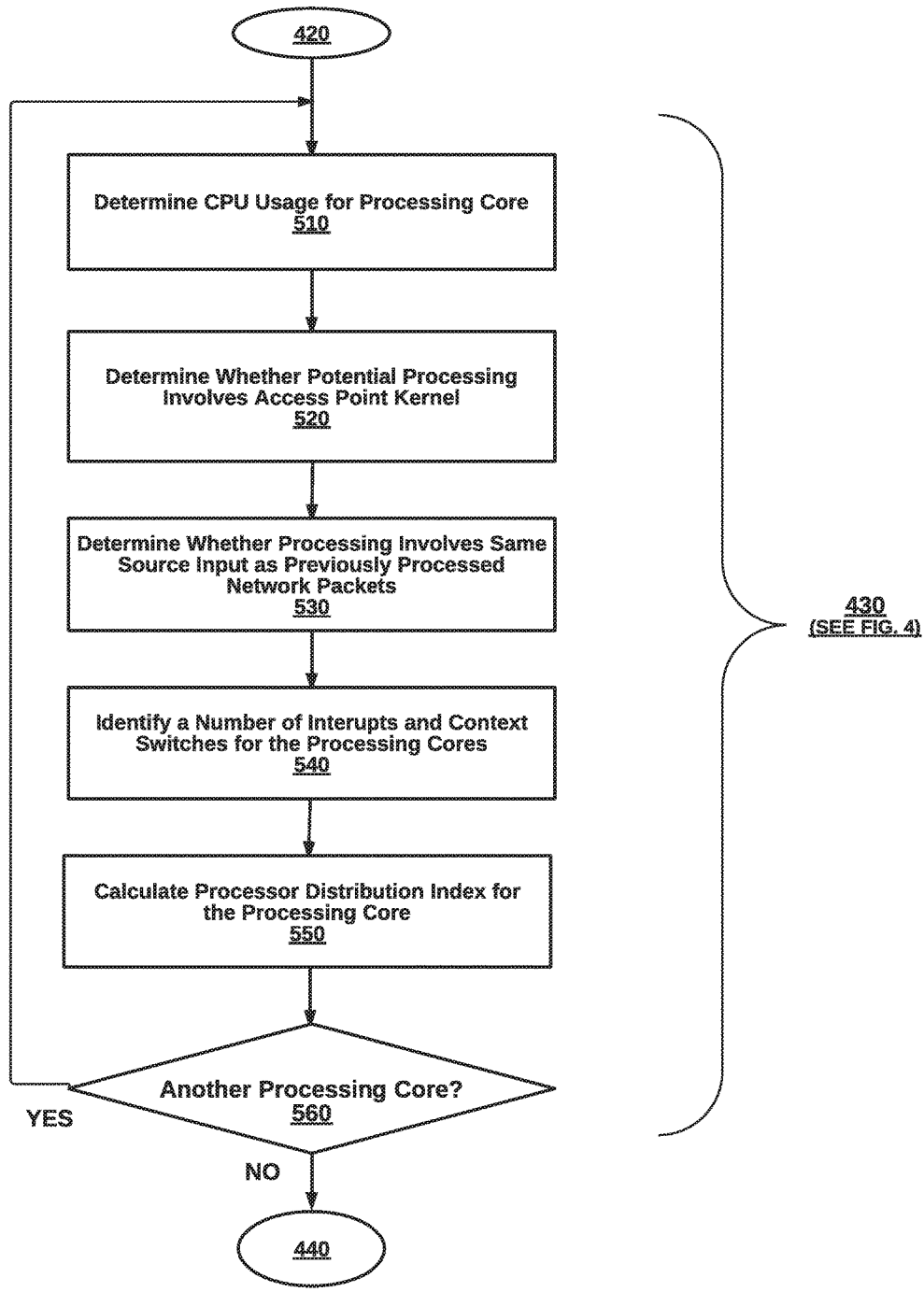
FIG. 5 is more detailed flow diagram illustrating a step of calculating a distribution packet index in the method of FIG. 4, according to one embodiment.

FIG. 4 is a high-level flow diagram illustrating a method 400 for packet processor steering in WLAN access points with multiple processing cores based on WLAN packet attributes, according to one embodiment. The method 400 can be implemented, for example, by the system 100 of FIG. 1. The steps are merely representative groupings of functionality, as there can be more or fewer steps, and the steps can be performed in different orders.

At step 410, a network packet is received for processing at an input source of multiple input sources of an access point. The access point has multiple processing cores available to process network packets destined for one or more of the many output destinations of the access point.

If the received network packet has a single output destination, at step 420, a preferred distribution packet index is calculated for the network packet, at step 430. The calculation step is described in more detail below with reference to FIG. 5. Otherwise, at step 420, the received network packet has multiple output destinations, for example, being transmitted to a group residing on both a IEEE 802.11ac network as well as a IEEE 802.11 b or g or n network. In this case, at step 425, the network packet can be processed with a default processing core. Some embodiments can have a separate decision matrix for selecting between multiple cores for network packets having multiple destinations.

At step 440, a processing core of the multiple processing cores is selected based on having an optimal processing distribution score. Once each of the processing cores has been scored relative to the network packet, the lowest score can be selected as the optimal processing path. Some embodiments select a processing core with respect to a group of packets, for example, from a common session.

At step 450, the network packet is processed with the selected processing core. The network processing involves various tasks at different access points. In a simplest instance, a packet is replicated at an output without any manipulation. In other cases, kernel level actions can be applied, such as deep packet inspection, and submission of network packets upstream to a controller for management feedback. Access point policies can be applied during packet processing. A set of SDN (software defined networking) rules can be applied to a network packet. In yet another instance, content of the network packet is repackaged from Ethernet headers and repackaged with certain Wi-Fi headers. Many other types of processing are possible.

At step 460, the processed network packet is transmitted at an output destination. A forwarding agent routes from processing to an appropriate output destination.

FIG. 5 is more detailed flow diagram illustrating the step 430 of modifying connection packets to acquire profile information the method of FIG. 4, according to one embodiment.

At step 510, CPU usage for a processing core is determined.

At step 520, it is determined whether potential processing involves a kernel layer of an access point operating system. The kernel portion of the operating system performs baseline services such as deep packet inspection, and replication of network packets to a controller for management input.

At step 530, it is determined whether processing involves a same source input as previously processed network packets. A moving window can configure how far back network packets should be considered. Sequential network packets sent one after another would qualify as same source input. In another case, a first network packet is processed on a certain network core, while in between packets were from different source inputs and processed on different processors. A network packet showing on the same source input as the first network packet, that network packet is considered as being from the same source.

At step 540, a number of interrupts and context switches is identified for the processing cores.

At step 550, a processor distribution index is calculated for the core. The process continues at step 560 until all the processing cores have been considered. An unavailable processing core need not be considered.

III. Generic Computing Device (FIG. 6)

FIG. 6 is a block diagram illustrating an example computing device 600 for use in the system 100 of FIG. 1, according to one embodiment. The computing device 600 is an example device that is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an access point on a data network having multiple processing cores and multiple Wi-Fi network interfaces, for steering Wi-Fi network packets of multiple Wi-Fi protocols, the method comprising the steps of:
receiving a network packet for processing between a source and destination, the source or destination being one of a core network interface and the other of the source or destination being one of multiple Wi-Fi interfaces, wherein the multiple Wi-Fi interfaces include at least one Wi-Fi interface dedicated to network packets in compliance with IEEE 802.11ac and at least one Wi-Fi interface dedicated to network packets in compliance with IEEE 802.11b/g/n;
determining whether the network packet has a destination involving a single station or multiple stations;
responsive to a determination of a single station destination, determining a packet distribution index for the network packet with respect to each of the multiple processing cores, wherein the packet distribution index is based on at least one of IEEE 802.11ac and the IEEE 802.11bgn;
selecting the processing core having a lowest packet distribution index for processing the network packet;
processing the network packet at the selected processing core; and
transmitting the processed network packet over an appropriate one of multiple Wi-Fi interfaces and the core network interface, opposite of the received network packet.

2. The method of claim 1, the step of determining the packet distribution index comprises:
determining a current CPU usage for each of the processing cores.

3. The method of claim 1, the step of determining the packet distribution index comprises:
determining whether processing of the network packet involves an access point kernel for deep packet inspection; and
assigning more weight to a processing core of the multiple processing cores that is preassigned to handle deep packet inspection.

4. The method of claim 1, the step of determining the packet distribution index comprises:
determining whether processing of the network packet involves an access point kernel for sending packets to a controller that manages packet flows for a plurality of access points on the data network including the access point; and
assigning more weight to a processing core of the multiple processing cores that is preassigned to handle controller management.

5. The method of claim 1, the step of determining the packet distribution index comprises:
determining whether a source of the network packet matches a source of previously processed network packets having some data stored in a cache of one of the multiple processing cores that previously processed networking packets from the source; and
assigning more weight to a processing core having some stored cache data from previously processed network packets of the source.

6. The method of claim 1, the step of determining the packet distribution index comprises:
identifying a number of interrupts from IRQs (interrupt requests) on each of the processing cores of the multiple processing cores; and
assigning more weight to a processing core having a lower number of interrupts.

7. The method of claim 1, the step of determining the packet distribution index comprises:
identifying a number of context switches on each of the processing cores.

8. The method of claim 1, further comprising:
receiving periodic feedback about from each of the multiple processing cores to determine the packet distribution index.

9. The method of claim 1, wherein the core network interface comprises multiple core network interfaces and the network packet is received or transmitted with respect to one of the multiple core network interfaces.

10. An access point on a data network having multiple processing cores and multiple Wi-Fi network interfaces, for steering Wi-Fi network packets of multiple Wi-Fi protocols, the access point comprising:
a core network interface and multiple Wi-Fi interfaces to receive a network packet for processing between a source and a destination, the source or destination being one of at least one core network interface and the other of the source or destination being one of multiple WLAN interfaces, wherein the multiple Wi-Fi interfaces include at least one Wi-Fi interface dedicated to network packets in compliance with IEEE 802.11ac and at least one WLAN interface dedicated to network packets in compliance with IEEE 802.11bgn;
a processor classification agent, coupled in to a data path between the at least one core network interfaces and the multiple Wi-Fi network interfaces, the processor classification agent to determine whether the network packet has a destination involving a single station or multiple stations, responsive to a determination of a single station destination, the processor classification agent to determine a packet distribution index for the network packet with respect to each of the multiple processing cores, wherein the packet distribution index is based on at least one of IEEE 802.11ac and the IEEE 802.11b/g/n, and the processor classification agent to select the processing core having a lowest packet distribution index for processing the network packet,
wherein the selected processing core processes the network packet at the selected processing core; and
a forwarding agent sends the processed network packet for transmission over an appropriate one of multiple Wi-Fi interfaces and the core network interface, opposite of the received network packet.

* * * * *